United States Patent
Kitaguchi et al.

[11] Patent Number: 5,700,565
[45] Date of Patent: Dec. 23, 1997

[54] COMPOSITE MAGNETO-OPTICAL INFORMATION RECORDING MEDIA

[75] Inventors: Tooru Kitaguchi; Mikio Yoneda, both of Himeji, Japan

[73] Assignee: Daicel Chemical Industries, Ltd., Osaka, Japan

[21] Appl. No.: 532,006

[22] Filed: Sep. 21, 1995

Related U.S. Application Data

[63] Continuation of Ser. No. 371,459, Jan. 11, 1995, abandoned, which is a continuation of Ser. No. 118,091, Sep. 8, 1993, abandoned, which is a continuation of Ser. No. 576,025, Aug. 31, 1990, abandoned.

[30] Foreign Application Priority Data

Aug. 31, 1989 [JP] Japan .................. 1-224900

[51] Int. Cl.$^6$ .................................................. G11B 5/66
[52] U.S. Cl. .......... 428/332; 428/336; 428/694 ML; 428/694 DE; 428/694 RL; 428/694 RE; 428/64.3; 428/64.8; 428/900
[58] Field of Search ............. 428/694 RL, 900, 428/64.3, 64.8, 694 ML, 694 DE, 694 RE, 332, 336

[56] References Cited

U.S. PATENT DOCUMENTS

4,670,323  6/1987  Nakamura et al. ............. 428/694

FOREIGN PATENT DOCUMENTS

| 0233034 | 8/1987 | European Pat. Off. . |
| 233034 | 8/1987 | European Pat. Off. . |
| 59-201247 | 11/1984 | Japan . |
| 59-227055 | 12/1984 | Japan . |
| 61-11952A | 1/1986 | Japan . |
| 63-029724 | 2/1988 | Japan . |

OTHER PUBLICATIONS

1. Pockrand J.D. Swalen, R. Santo, A. Brillante, and M.R. Philpott "Optical Properties of organic dye monolayers by surface plasmon spectroscopy" Journal of Chemical Physics,American Institute of Physics,N.Y., vol. 69 N9 Nov. 1, 1978.

*Primary Examiner*—Leszek Kiliman
*Attorney, Agent, or Firm*—Loeb & Loeb LLP

[57] ABSTRACT

A composite magneto-optical information recording medium comprising a substrate (1) and a composite magneto-optical recording layer deposited on said substrate. The composite magneto-optical recording layer comprises a magneto-optical layer (2), a metallic layer (3) and an electron transition layer (4) which exhibits transition of electrons in a wavelength range of a laser beam used for recording and/or regenerating information, the three layer being layered successively in this order so that said laser beam (L) impinges on the side of said magneto-optical layer (2).

9 Claims, 3 Drawing Sheets

COMPOSITE MAGNETO-OPTICAL INFORMATION RECORDING MEDIA

This application is a continuation of application Ser. No. 08/371,459, filed Jan. 11, 1995, application Ser. No. 08/118/091, filed Sep. 8, 1993, application Ser. No. 07/576,025, filed Aug. 31, 1990, all now abandoned.

BACKGROUND OF THE INVENTION

1. Field of the Invention

The present invention relates to magneto-optical information recording media having an improved composite recording layer.

The magneto-optical information recording media according to the present invention are advantageously applicable to magneto-optical recording disks, cards, tapes and the like which are used as document filing memories, video filing memories, external memories for computers.

2. Related Art

Magneto-optical recording disks (MO disks) are used in such an application as an erasable recording memory for computers. In the magneto-optical recording disks, information is recorded by the thermo-optical effect in which the orientation of a magnetic domain is changed by heat given by a laser beam, while regeneration of the information is effected by the magneto-optical effect in which a small change of the polarization angle of a laser beam is detected optically so that the direction of magnetization in the domain is determined.

The intensity of regeneration signals of the magneto-optical recording media is strongly influenced by the reflectance from a recording layer and by the change of polarization angle (polar Kerr rotational angle: $\Theta_k$) of a laser beam. In other words, in order to improve the performance of regeneration of the magneto-optical recording media, it is indispensable to increase the polar Kerr rotational angle: $\Theta_k$ and/or to increase reflectance.

Therefore, several proposals for increasing an apparent value of $\Theta_k$ and/or the reflectance have been made. For example, more than one thin layers of dielectric material are deposited on the magneto-optical recording layer so that a light-pass of a laser beam is extended when the laser beam travels at plural times in the magneto-optical layer due to multi-reflection of the laser beam, resulting in increment of the value of $\Theta_k$ (this structure is called "interference film type"). In order to increase the reflectance, a relatively thick reflective layer of metal such as aluminum is arranged under the magneto-optical recording layer (this structure is called "reflective layer type").

The interference film type structure, however, is difficult to be produced on a mass production scale, because the thickness of the interference film layer of dielectric material must be controlled precisely. The film thickness of the interference film layer must be optimized if the wavelength of a semiconductor laser is changed or improved because the interference effect depends on the wavelength.

In the case of the reflective layer type structure, the recording sensitivity is spoiled because thermal energy of a laser beam is absorbed by the metallic layer whose thermal conductivity is very high. Furthermore, the increment of the value of $\Theta_k$ is determined by the reflectance of the reflective layer used.

The present inventors proposed, in Japanese patent application No. 223, 743/1988, a new concept of a composite magneto-optical recording medium. In this medium, a layer made of a substance which exhibits electron transition in a wavelength range of a light source used (hereinafter called "electron transition layer") is combined with a magneto-optical recording layer. Although this magneto-optical recording medium itself functions satisfactorily, there is a problem that the electron transition layer diffuse or migrate into an adjacent magneto-optical recording layer, resulting in the oxidation or deteriation of the magneto-optical recording layer. This is because the electron transition layer is deposited directly on the magneto-optical recording layer.

The present inventors tried to solve the above-noted problem, and found an improved composite magneto-optical recording medium which enhances the value of $\Theta_k$ and which is applicable in practical uses without oxidation or deterioration of the magneto-optical recording layer.

Therefore, it is an object of the present invention to provide a composite magneto-optical recording medium based on the above-mentioned new concept which is characterized by enhancement in the value of $\Theta_k$ as well as in the sensitivity during the regeneration of information and by high resistance to oxidation and degradation.

SUMMARY OF THE INVENTION

A composite magneto-optical information recording medium according to the present invention comprises a substrate and a composite magneto-optical recording layer deposited on the substrate, and is characterized in that the composite magneto-optical recording layer comprises a magneto-optical layer, a metallic layer and an electron transition layer which exhibits transition of electrons in a wavelength range of a laser beam used for recording and/or regenerating information, the three layers being layered successively in this order so that the laser beam impinges on the side of the magneto-optical layer.

The magneto-optical recording medium used in the present invention can have any shape including disk, drum, tape, card and the like, and its configuration depends on a shape of the substrate. The composite magneto-optical recording layer can be formed on one surface or on both surfaces of the substrate. The media may have any known mode and structure including so-called "reflection mode" or "transmission mode" and "air-sandwich type" or "tightly bonded double substrates type" etc. Generally, the reflection mode with the tightly bonded double substrate type is used.

According to the present invention, a laser beam which is used for recording and/or reading information enters the magneto-optical layer first. In other words, the three layers of magneto-optical layer, metallic layer and electron transition layer are layered successively in this order along a direction of incidence of a laser beam. Therefore, in the case of the "reflection mode", the magneto-optical layer is deposited on the transparent substrate directly or through a suitable protective layer. This protective layer may be made of organic glass that resists the penetration of moisture through the transparent plastic substrate.

The substrate can be made of any material including metal, glass, plastic and ceramics. In the case of the "reflective mode" (which is the most popular mode), both recording and read-out are effected through a transparent substrate, so that the substrate must be made of transparent material, preferably a transparent plastic such as polycarbonate, polymethylmethacrylate, or amorphous polyolefins. It is possible to use light-transmitting ceramics such as GGG or tempered glass. The substrate has preferably guide grooves for guiding a laser beam and/or control-signal pits for addressing or the like on the surface thereof. Usually, the substrate has pre-grooves or pre-pits for tracking a laser beam and pits corresponding pre-format for addressing, error correction and synchronization.

The magneto-optical recording layer used in the present invention is made of any known material that exhibits satisfactory Kerr effect and/or Faraday effect such as amorphous alloys of rare earth/transition (R/T) metal, spinel ferrite, hexagonal ferrite and the like. The magneto-optical layer has preferably a thickness of from 100 Å to 1,000 Å.

As defined above, the electron transition layer is made of a substance that exhibits electron transition. This substance can be any material that causes transition of electrons in the range of wavelength of ultra-violet, visible and infra-red zone. In usual practice, substances which exhibit electron transition in the range of wavelength of visible zone and infra-red zone are preferably used, because the laser sources which are available today for recording and/or reading-out information are semiconductor lasers, argon laser or helium laser. These lasers have their maximum absorption in the wavelength range of visible zone and near infra-red zone. Semiconductor lasers are the most preferred because they are small in size. It is apparent that future semiconductor lasers which will have a shorter wavelength of about 400 nm instead of about 800 nm of today's model can be applicable to the present invention.

The substances for the electron transition layer which satisfy the above-mentioned conditions are easily found in dyes and/or pigments which exhibit absorption in the visible wavelength zone. However, the present invention is not limited to so-called dyes and/or pigments but includes any material that exhibits electron transition and absorption in the ranges of wavelength from ultra-violet zone to infra-red zone. The layer of dyes and/or pigments can have a thickness of from 0.1 μm to 5 μm.

Now, the present invention will be described with reference to attached drawings.

DETAILED DESCRIPTION OF THE INVENTION

Figure 1:
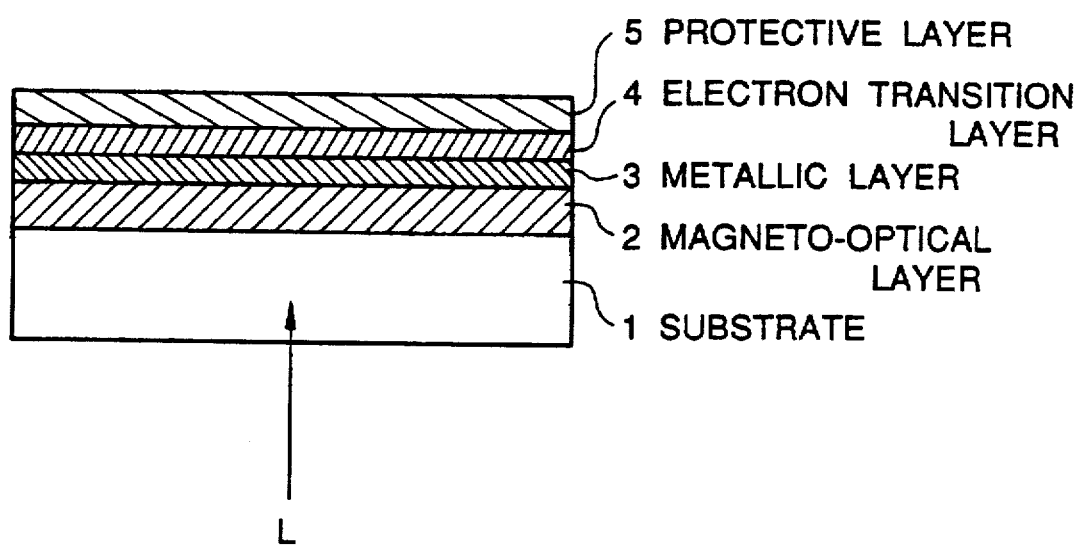
FIG. 1 is an illustrative cross sectional view of a composited magneto-optical recording medium according to the present invention.

FIG. 1 illustrates a typical construction of a composited magneto-optical recording medium according to the present invention. This composite magneto-optical information recording medium comprises a transparent substrate (1) and a series of layers deposited on the substrate and comprising a magneto-optical layer (2), a metallic layer (3), and an electron transition layer (4). A laser beam (L) for recording and reading is directed from the side of the substrate (1). A surface protective layer (5) can be made of any suitable material usable in this field of technology and may be formed on the electron transition layer.

Figure 2:
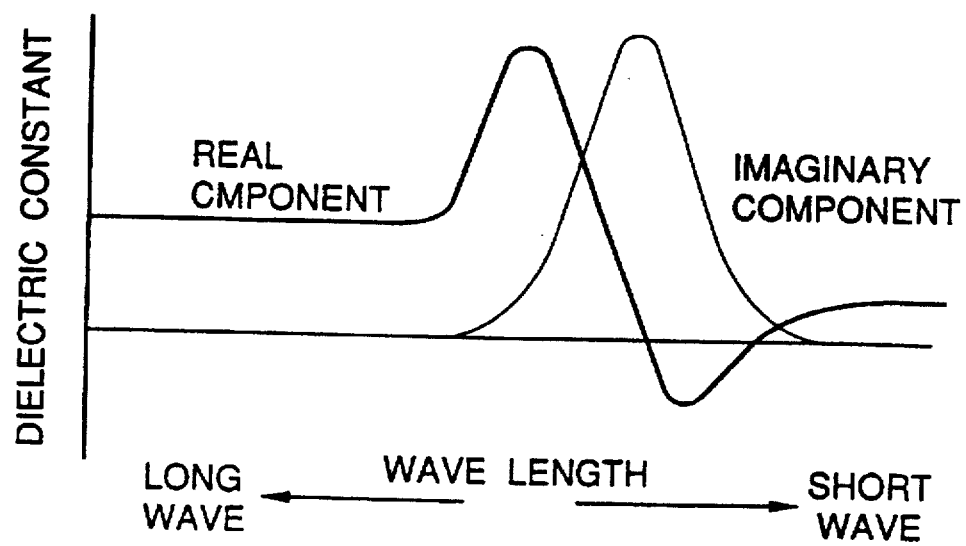
FIG. 2 illustrates the wavelength dependency of dielectric constants of a pigment or dye layer, which is used for explaining the principle of the present invention.

The present invention is an improvement over the invention disclosed in the Japanese patent application No. 223,743/1988. A basic mechanism of how the magneto-optical recording medium described in that patent application functions is shown in FIG. 2. FIG. 2 illustrates the change of complex dielectric constant of the substances which exhibit electron transition as a function of resonance wavelengths ($\epsilon^* = \epsilon' - j\epsilon''$). FIG. 2 shows that reflectance of the substance increases in such a wavelength range that a real component ($\epsilon'$) of the complex dielectric constant becomes nearly zero while an imaginary component ($j\epsilon''$) of the complex dielectric constant becomes satisfactorily lower. In other words, a film made of this substance functions as a reflective layer having a high reflectance which depends on the wavelength used. The wavelength dependency of dielectric constant of the substances which exhibit electron transition as well as their known in the field of optical physics. For example, L Porkrand et al. reports, in J. Chem. Phys, 69 (9), 1978, p 4001–4011, "optical properties of organic dyes by surface plasmon spectroscopy", the specific reflection effect of a composite thin film consisting of silver and organic dye.

This wavelength depending reflection effect can be utilized as a reflective layer for magneto-optical recording media to enhance apparent Kerr effect by multiple reflection of a laser beam in the magneto-optical recording layer.

In fact, the composite recording layer according to the present invention exhibits remarkably high $\Theta_k$ values. Although we cannot explain the reason theoretically, the inherent Kerr rotational angle $\Theta_k$ might increase apparently by a combination of the above-mentioned specific wavelength depending reflection effect (Japanese patent application No. 223,743/1988) with the metallic layer.

In the composite magneto-optic recording layer according to the present invention, the enhancement effect of the $\Theta_k$ value is neither influenced by variation of thickness which is inevitable in actual manufacturing conditions nor by variation of incident angle of the laser beam. This is an important advantage of the present invention.

Furthermore, oxidation or deterioration of the magneto-optical recording material caused by diffusion or migration of the electron transition layer into the magneto-optical layer is prevented effectively by the presence of the metallic layer interposed between the electron transition layer and the magneto-optical layer. In addition, the magneto-optical recording layer according to the present invention possesses higher recording sensitivity than the conventional "reflection mode", because the thickness of the metallic layer can be reduced relatively, and hence, the thermal diffusion is minimized.

Materials for the magneto-optical layer and the metallic layer and substances for the electron transition layer used in the present invention can be selected from known materials. Following are the examples but the scope of the present invention should not be limited to the following examples.

The magneto-optical materials used in the present invention are preferably those that have such Curie temperatures or compensation temperatures that magnetic domains can be held stably at about room temperature and that are magnetizable perpendicularly in order to reduce the size of magnetic domains for increasing recording density. Among the following magneto-optical materials, rare earth/transition metal alloys are most preferable:

(1) Garnets: $R_3Fe_5O_{12}$, $R_3(FeAl)_5O_{12}$ or $R_3(FeGa)_5O_{12}$ in which "R" is a rare earth element such as Y, Sm, Eu, Gd, Tb, By, Ho, Er, Tm, Tb or Lu.

(2) Spinel ferrites: $MFe_2O_4$ in which "M" is Mn, Fe, Co, Ni, Cu, Mg or $Li_{0.5}Fe_{0.5}$ (3) Hexagonal ferrites: $MFe_{12}O_{19}$ in which "M" is Ba, Pb, Sr, Ca, $Ni_{0.5}Fe_{0.5}$ or $Al_{0.5}La_{0.5}$ (4) Rare earth/transition metal alloys: GdCo, GdFe, DyFe, TbFe, GdTbFe, GdDyFe, TbFeCo, GdTbFeCo, (Gd, Fe)Bi, (Gd, Fe)Sn or BdDyFeCo (5) Polycrystals: MnBi, MnCuBi, MnAlGe, MnGaGe, PtCo, EuO or PtMnSb The metallic layer used in the present invention can be any metal provided that it is stable; therefore, very unstable metals such as alkali metals are excluded. Preferable metals are Al, Au, Cr, Cu, Ti, Zr, Nb, Ag, Pt, Fe, Co, Mn, Ni, Zn and V.

The metallic layer must be as thin as possible in order to reduce heat loss caused by high thermal conductivity, and has preferably a thickness of less than 200 Å, more preferably less than 100 Å. In order to compromise the enhancement effect of the value of $\Theta_k$ with the recording sensitivity, a thickness of about 50 Å is preferable.

Electron transition substance can be easily selected from so-called pigments and/or dyes. Following are non-limiting examples of the substance which exhibits electron transition in the wavelength range from ultra-violet zone to infra-red zone:

(1) For infra-red zone

Phthalocyaninine type pigments or dyes such as Co-phthalocyanine, Vo-phthalocyanine or Pb-phthalocyanine, Naphthoquinone type dyes, Naphthalocyanine type dyes, Squalium type dyes such as 4,6-diphenylpyrane-2-ylidene-qualium, 1,1-diethyl-4,4'-quinocarbo cyanine iodide, Cyanine type dyes, Azurenium type dyes, Chroconium type dyes or Dithiol nickel complexes.

(2) For visible zone

Crystal violet, Acridine dyes, Rhodamin B, Pigment Yellow 37, CI 77199, Pigment Yellow 35, CI 77117, Pigment Orange 20, CI 77196, Pigment Red 108, CI 77202, Pigment Orange 21, CI 77601, Pigment Yellow 34, CI 77603, Pigment Green 17, CI 77288, Pigment Green 18, CI 77289, Pigment Blue 28, CI 77346, Pigment Blue 27, CI 77510, Pigment Violet 16, CI 77442, Pigment Orange 23, CI 77201, Pigment Brown 6, CI 77499, Pigment Red 113, CI 77201, Pigment Red 104, CI 77605, Pigment Yellow 53, CI 77788, Pigment Red 101, CI 77491, Pigment Red 105, CI 77578, Pigment Brown 7, CI 77499, Pigment Yellow 32, CI 77893, Pigment Blue 29, CI 77007, Pigment Brown 7, CI 77499, Pigment Red 106, CI 77766, Pigment Yellow 36, CI 77955, Pigment Brown 11, CI 77495, Pigment Yellow 36, CI 77955, Prucyane blue or Antimony Red.

Each of the magneto-optical layer, the metallic layer and the electron transition layer can be formed or deposited on the substrate by physical vapour deposition (PVD) technique such as vacuum deposition, sputtering and the like. The electron transition layer can be formed also by coating technique such as spin-coating, dipping, spray coating and the like. In this case, the pigment or dyes can be dispersed or dissolved in suitable solvents, or binders.

It is apparent that, in the composite magneto-optical recording media according to the present invention, the following advantages are expected:

(1) Production management in a plant for producing the magneto-optical recording media can be facilitated owing to substantially no independence on wall thickness of the respective layer.

(2) The Kerr rotational angle $(\Theta_k)$ can be increased greatly.

(3) Loss of sensitivity at recording phase caused by increased thermal conductivity due to the existence of the metallic layer can be reduced greatly because the metallic layer can be thinner than the conventional reflection model media.

(4) Oxidation of magneto-optical layer caused by diffusion or migration of pigments or dyes can be prevented because the metallic layer is interposed between the magneto-optical layer and the pigments or dyes layer.

Now, examples of the present invention will be described but the scope of the invention should not be limited to the examples.

EXAMPLE 1

Preparation of Composite Magneto-Optical Disk

A reflection mode magneto-optical recording disk shown in FIG. 1 was produced.

First, a magneto-optical recording layer of $Tb_{23}Fe_{67}Co_{10}$ and having a thickness of 150 Å was deposited on a disk substrate made of glass having a diameter of 12 cm and a thickness of 1.2 mm by well-known radio-frequency (RF) sputtering method.

Then, a metallic layer of aluminum (Al) having a thickness of 50 Å was deposited on the magneto-optical recording layer by the same method as above.

As the substrate which exhibits electron transition, "Rhodamine B" was selected and was deposited on the metallic layer of aluminum by the well-known vacuum evaporation method. The thickness of the "Rhodamine B" was about 1 μm.

Finally, a protective layer of silicon of 400 Å thick was deposited on the "Rhodamine B" layer.

Evaluation of the Disk

The resulting optical disk was magnetized perpendicularly with respect to a surface of the substrate in an external magnetic field of 10 K Oe. After the external magnetic field was removed, a light beam from a monochromator was directed onto an opposite surface of the substrate at an incident angle of about 90 degrees with respect to the surface of the disk and the wavelength was shifted continuously to determine the change of the value of $\Theta_k$ (polar Kerr rotational angle).

Figure 3:
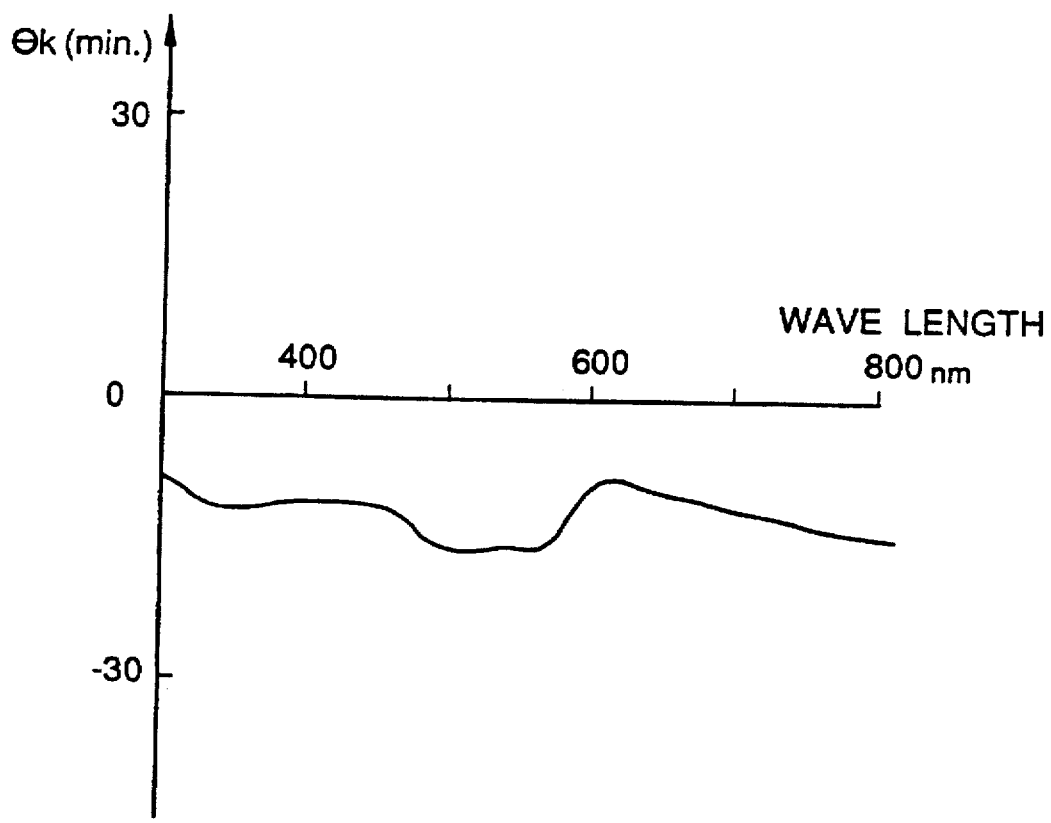
FIG. 3 illustrates the wavelength dependency of the polar Kerr rotational angle ($\Theta_k$) of a magneto-optical recording medium of Example 1 according to the present invention.

FIG. 3 shows the wavelength dependency of the $\Theta_k$ value (minute). FIG. 3 reveals that the composite magneto-optical recording layer according to the present invention shows a very high apparent polar Kerr rotational angle $(\Theta_k)$ of 21 minute at a wavelength of about 500 nm.

Figure 4:
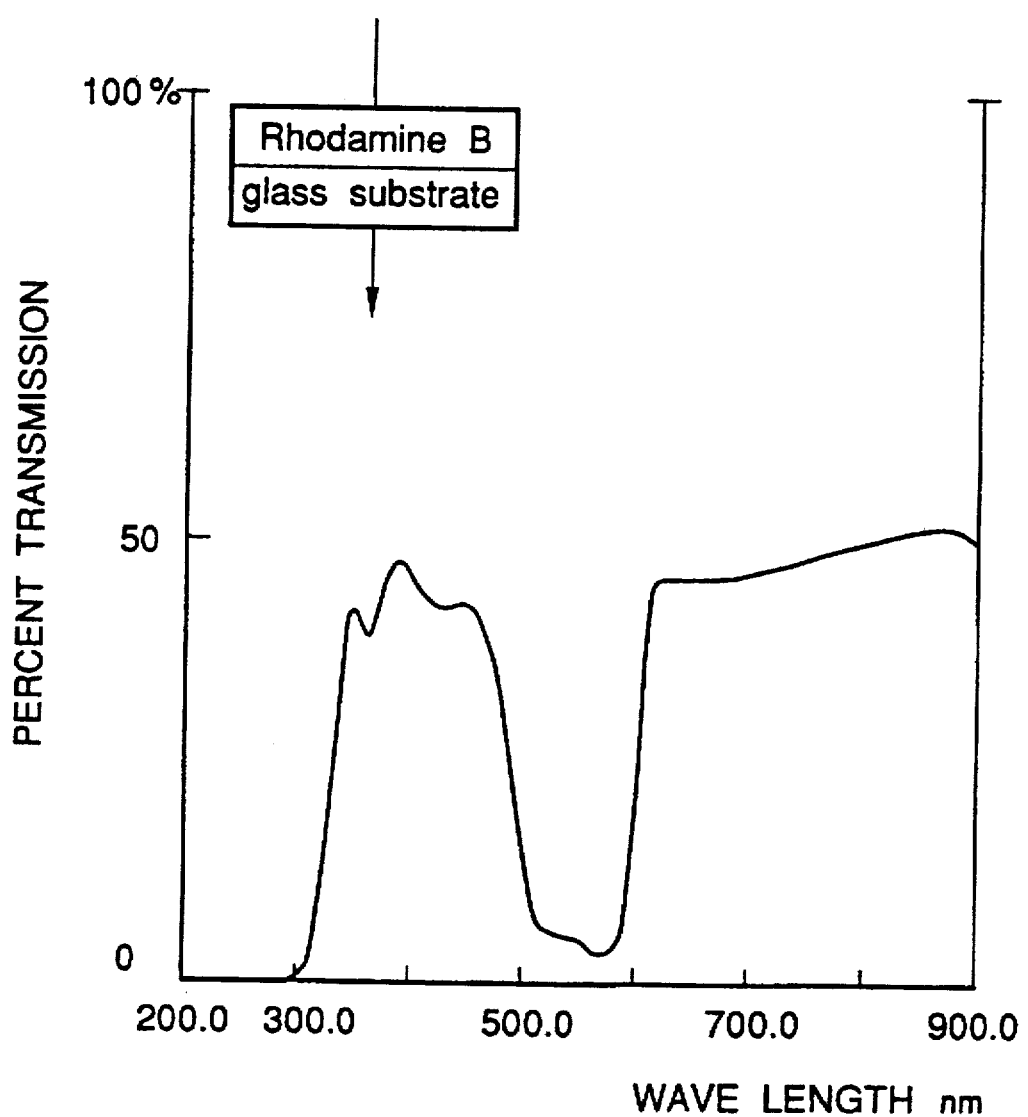
FIG. 4 illustrates the wavelength dependency of percent transmission of "Rhodamine B", which is shown for a comparison purpose.

For comparison, only a layer of "Rhodamine B" was deposited on a glass disk substrate by the same method as above and the percent transmission of the resulting "Rhodamine B" layer was measured by the monochromator. FIG. 4 shows the result of wavelength dependency of the percent transmission of the "Rhodamine B" layer. From FIG. 4, it was understood that the maximum absorption of "Rhodamine B" layer occur at about 580 nm.

Comparing FIG. 3 with FIG. 4, it is apparent that the enhancement effect of the polar Kerr rotational angle $(\Theta_k)$ of the composite magneto-optical recording layer at the wavelength of about 500 nm is contributed to the existence of "Rhodamine B" layer.

This experimental result reveals that the Kerr rotational angle $(\Theta_k)$ can be increased greatly at predetermined wavelengths by adopting the composite recording medium having the magneto-optical layer, the metallic layer and the dye or pigment layer which are laminated in this order from the incident direction of a laser beam.

The wavelength depends on the nature of pigments or dyes used. In other words, magneto-optical recording media which are the most suitable for a selected wavelength can be produced by selecting the nature of pigments or dyes.

We claim:

1. A composite magneto-optical information recording medium comprising a substrate and a composite magneto-optical recording layer deposited on said substrate, in which information is written in or read from said composite magneto-optical recording layer by a laser beam that impinges onto said substrate, said composite magneto-optical recording layer comprising a magneto-optical layer directly deposited on said substrate, a metallic layer having a thickness of less than 200 Å deposited on said magneto-optical layer, and an electron transition layer deposited on said metallic layer and which exhibits an electron transition in the wavelength range of said laser beam from the visible zone to the infra-red zone.

2. The composite magneto-optical information recording medium set forth in claim 1, wherein said metallic layer has a thickness of less than 100 Å.

3. The composite magneto-optical information recording medium set forth in claim 1, wherein said metallic layer is made of a metal selected from the group consisting of Al, Au, Cr, Ti, Zr, Nb, Ag, Pt, Fe, Co, Mn, Ni, Zn and V.

4. The composite magneto-optical information recording medium set forth in claim 1, wherein said electron transition layer is made of dyes or pigments or both.

5. The composite magneto-optical information recording medium set forth in claim 4, wherein the electron transition layer has a thickness of 0.1 µm to 5 µm.

6. The composite magneto-optical information recording medium set forth in claim 1, wherein said magneto-optical layer is made of alloy of rare earth/transition metal.

7. The composite magneto-optical information recording medium set forth in claim 6, wherein said magneto-optical layer has a thickness of from 100 Å to 1,000 Å.

8. The composite magneto-optical information recording medium set forth in claim 1, wherein a surface protective layer is further deposited on said electron transition layer.

9. The composite magneto-optical information recording medium set forth in claim 1, wherein said magneto-optical layer comprises $Tb_{23}Fe_{67}Co_{10}$, said metallic layer comprises aluminum, and said electron transition layer comprises Rhodamine B.

* * * * *